Dec. 28, 1948. F. AMIOT 2,457,625
CONTROLLING MEANS., ESPECIALLY FOR DOORS
Filed Aug. 5, 1939 4 Sheets-Sheet 1

Inventor:
Félix Amiot,
Attorneys

Dec. 28, 1948.                F. AMIOT                2,457,625
            CONTROLLING MEANS, ESPECIALLY FOR DOORS
Filed Aug. 5, 1939                              4 Sheets-Sheet 3

Inventor:
Félix Amiot,
Bailey & Parson
Attorneys

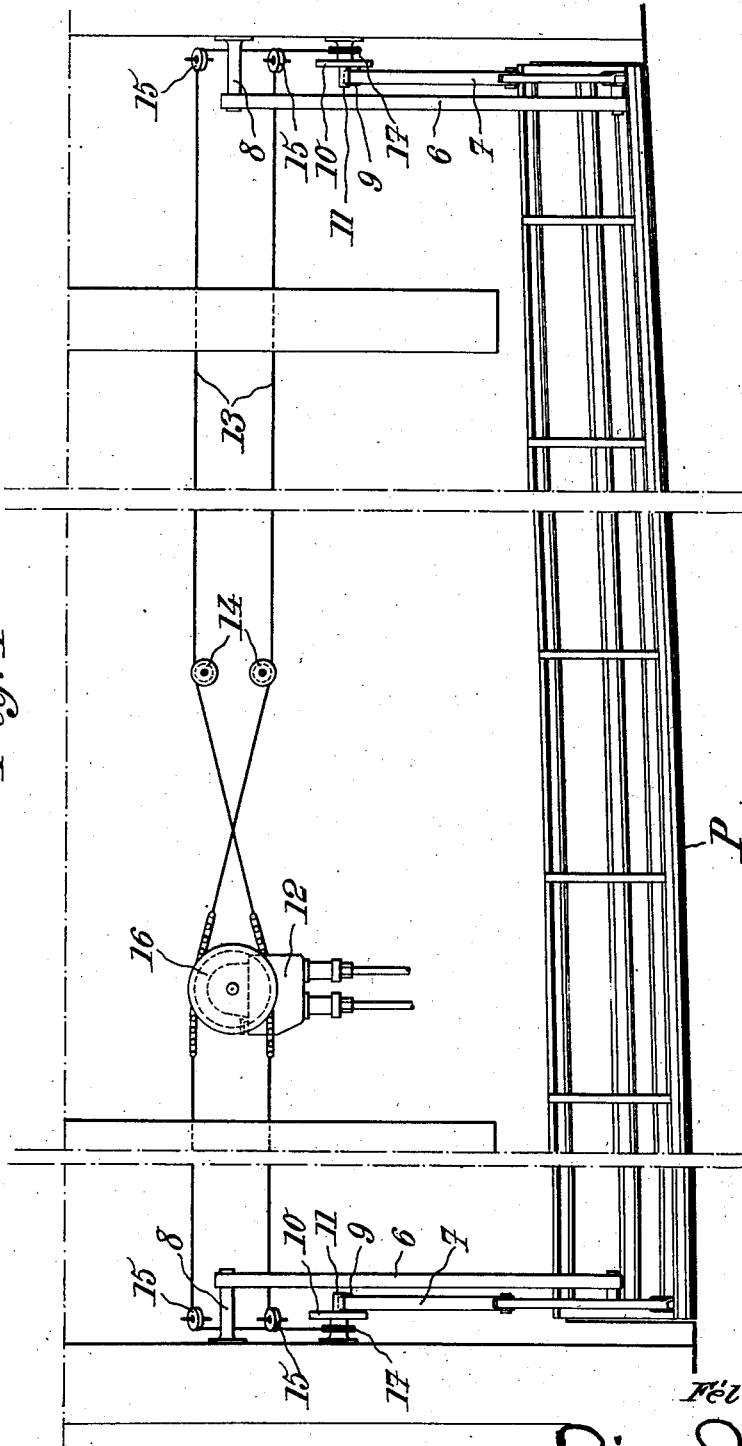

Patented Dec. 28, 1948

2,457,625

UNITED STATES PATENT OFFICE 2,457,625

CONTROLLING MEANS, ESPECIALLY FOR DOORS

Felix Amiot, Neuilly-sur-Seine, France

Application August 5, 1939, Serial No. 288,680
In France January 19, 1939

Section 3, Public Law 690, August 8, 1946
Patent expires January 19, 1959

7 Claims. (Cl. 244—129)

The present invention relates to means for controlling the opening of a panel or door, more especially in connection with aircrafts.

The chief object of the present invention is to provide means of this kind which, on the one hand, ensure a fluidtight closing and, on the other hand, reduce the room occupied by the door to a minimum.

According to an essential feature of the present invention, considering first the closed position, in which the door or panel substantially ensures the continuity of the wall in which the aperture to be closed is provided, the means in question permit displacing the door transversely a distance at least equal to the thickness of said wall and then of laterally clearing the aperture.

According to another feature of the present invention, relating to aircrafts provided with apertures exposed to the action of relatively moving air, the doors are arranged in such manner that, in the closed position, they ensure a continuous surface of the outer wall of the aircraft structure, and that, in the opening position, they can be drawn substantially against the walls of the structure, in particular on the inside.

Other features of the present invention will result from the following detailed description of some specific embodiments thereof.

Figure 1:
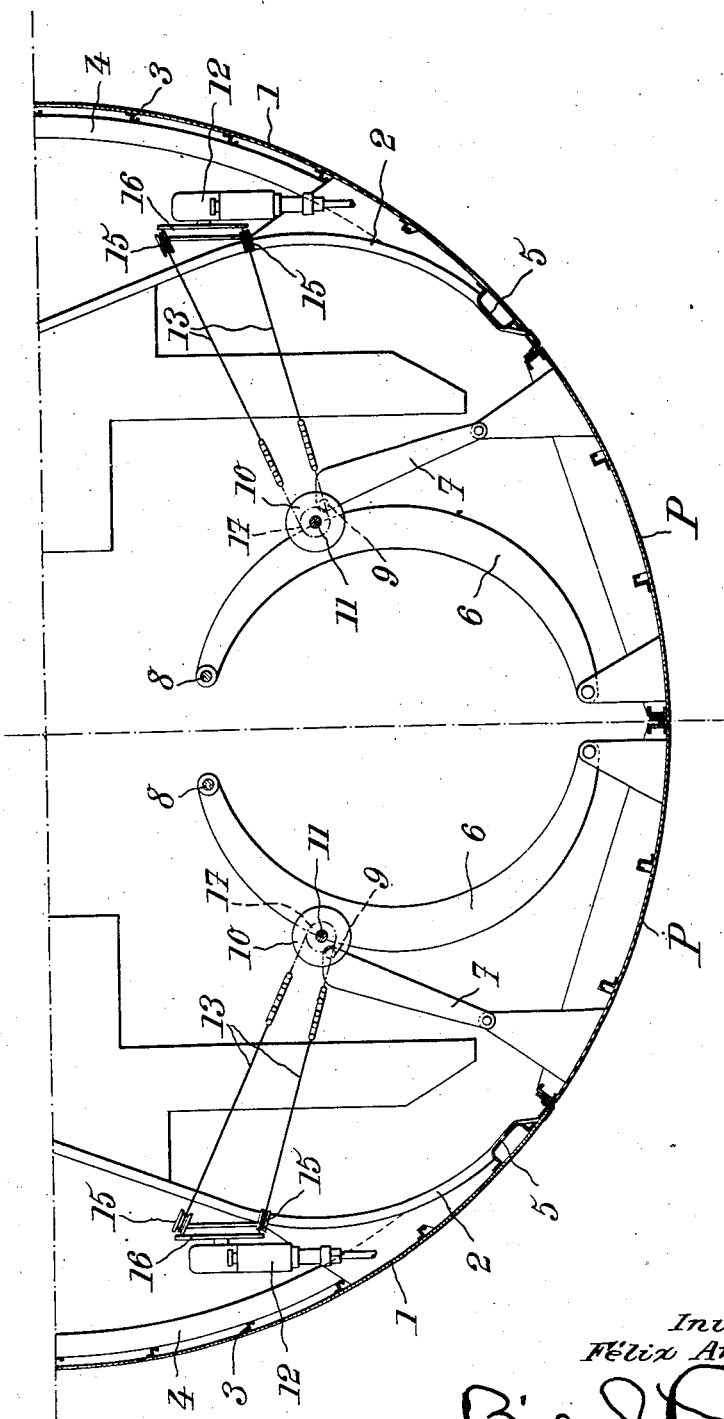
Figure 2:
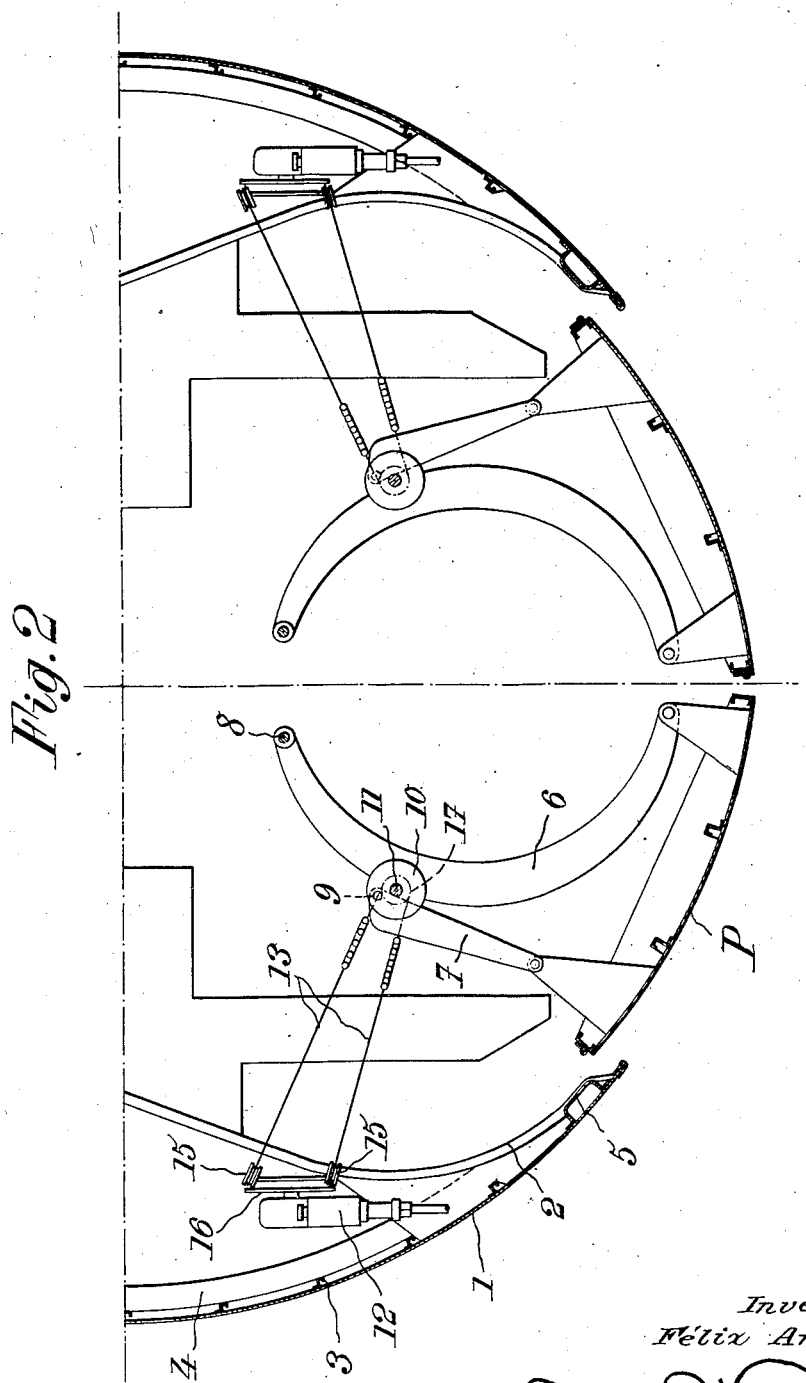
Figure 3:
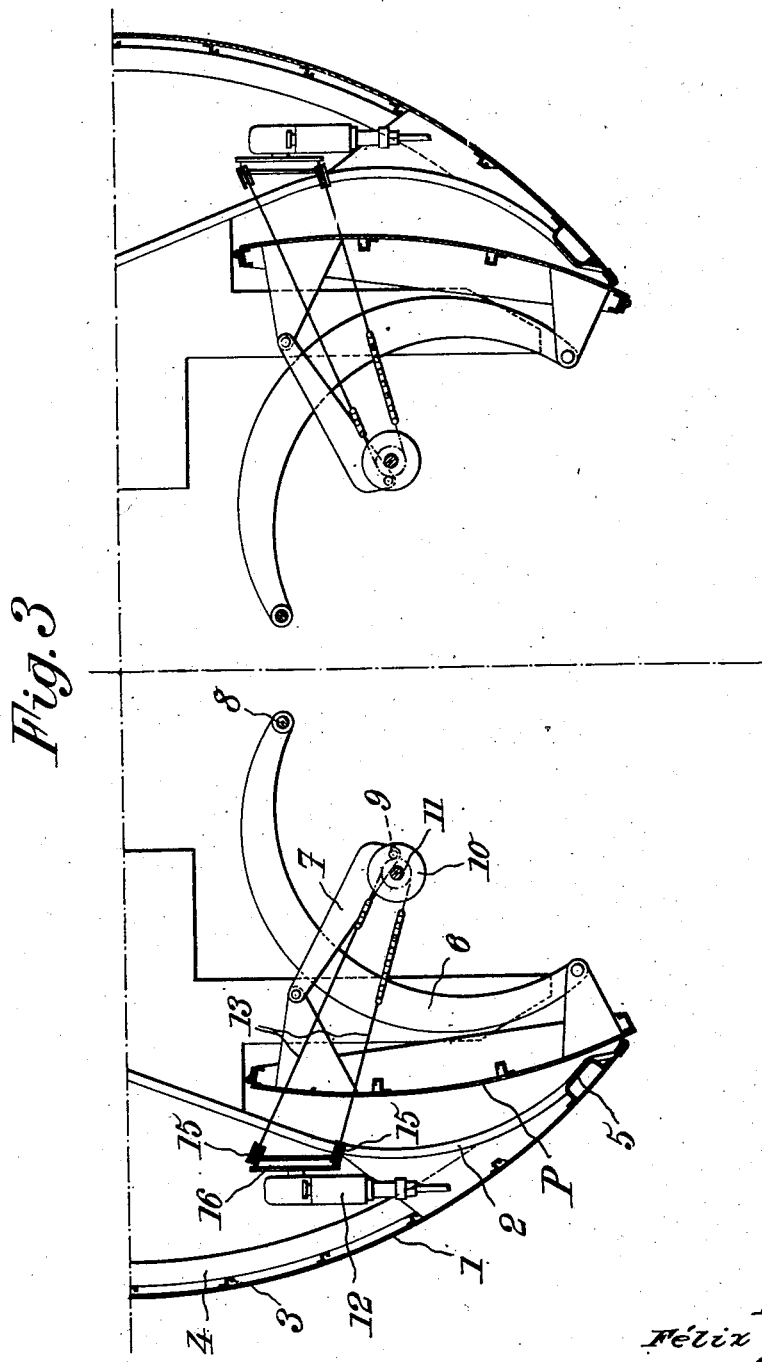

Preferred embodiments of the present invention will be hereinafter described, with reference to the accompanying drawings, given merely by way of example, and in which:

Fig. 1 is a transverse section of an airplane fuselage with apertures fitted with closing means according to the invention, in the closed position;

Figs. 2 and 3 also show in transverse section the same structure, and correspond to two different positions of the doors.

Fig. 4 shows the same structure, in plan view.

In the following description, I will consider the case of an aircraft the structure of which is provided, in a portion thereof subjected to the effects of relatively moving air, with apertures (for instance for the passage of a retractable landing gear, for throwing bombs, etc.) which are to be fitted with doors for closing them.

Said doors are devised in such manner that, in their closed position, they ensure the continuity of the outer surface of the aircraft structure and that, on the other hand, in their opened position, they can be cleared laterally on the inside of the aircraft, especially against some of the walls thereof, so that the displacements of the doors can take place with the minimum disturbance and furthermore, when they are opened, they produce no supplementary drag, as is the case with existing doors pivoting toward the outside.

In the example illustrated by the drawing, the doors P, P' are intended to close at least one aperture provided at the lower part of an airplane fuselage. These doors P, P' are adapted, in moving to open position, according to the invention, to move laterally along the walls 1 of said fuselage, or rather, as shown by the drawing, along some structural elements 2 provided on the inside thereof (Fig. 3).

In the case of a fuselage of the stressed skin type, including stringers 3, formers 4, longitudinal members 5, and so on, the doors may be made of the following structure:

Concerning the means for controlling the displacements of the door or doors, they are arranged in such manner that, starting from the closed position they permit of effecting the opening in two steps, one involving displacement of the door a distance at least equal to the thickness of the wall of the fuselage, while the other corresponds to a lateral displacement on the inside of the fuselage to a position clear of the opening in which they lie when in closed position.

I have found that it is advantageous to use the following parts for producing both of these successive movements.

In the example given use is made, for producing the general movement of the door and also for supporting it in its closed position, of a kinetic system constituted by an articulated quadrilateral, including, for instance, several pairs of arms 6, 7 of suitable shape and respectively pivoted about suitably disposed axes 8, 9. The transverse displacement for moving the door a distance equal to the thickness of the wall of the fuselage (the first step in opening) is effected in such manner that one of the axes 8, 9 can be suitably displaced at the beginning of the opening.

As a rule, it will suffice to make the axis 9 which is located at the shortest distance from the fuselage movable in a suitable manner. For instance, this axis will be carried, for this purpose, by a small crank or a movable disc 10 movable about a fixed axis, and secured, for instance, on a shaft element 11.

According to a preferred embodiment, the two steps of the opening of the door will be controlled through this disc 10. In this case, when the transverse clearing movement has been performed, it suffices to have this disc cooperate, through a suitable abutment which may be constituted by shaft 11, with the corresponding arm 7, which is then driven by said disc in its rotary movement.

Figs. 2 and 3 respectively show the positions of the whole, on the one hand after the first step of transverse displacement of the door and, on the other hand, after the second step of longitudinal or lateral clearing movement thereof, that is to say at the end of its opening movement.

Generally, quadrilateral includes two pairs of arms 6, 7 (Fig. 4), two discs 10, to which the motive energy is transmitted through any suitable means.

Instead of securing both of these discs on the same shaft, the position of which on the inside of the fuselage might be disadvantageous, they can be driven separately, the two corresponding shaft elements being driven by electric, mechanical, hydraulic, pneumatic, or other means. Such a construction can be employed for each of the two doors, P, P', on the right and on the left, although the movements of these two doors can also, eventually, be mechanically conjugated.

In the drawing, the driving means are shown as constituted by hydraulic systems 12, movable in two directions, these systems being for instance connected with the shafts 11 of discs 10 through chains or cables 13 and transmissions 14, 15. In the embodiment illustrated by the drawing, the cable is controlled by a pulley 16 and acts on other pulleys 17 keyed on shafts 11.

Other specific arrangements might also be used for the same purpose.

Advantageously, the driving means 12—16 are located in close proximity to the wall 1 of the fuselage.

Whatever the particular arrangement that is chosen, the device according to the invention as above described has many advantages, the most important of which are the following:

It ensures a fluidtight closing of the apertures;

It occupies relatively little space, for the opening operation, on the inside of the fuselage;

It does not produce any supplementary drag in the opened position;

It is simple and easy to operate.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an airplane or the like fuselage having an opening through the wall thereof and a door lying flush with the outer side of the wall of said fuselage, means supporting said door in said opening comprising a rotatable member mounted in said fuselage to rotate about a first axis, a link member pivoted at one end to said rotatable member for rotation about a second axis spaced from said first axis, the other end of said link member being pivoted to one portion of said door, one of said members engaging the other upon predetermined relative rotation in one direction providing a stop to prevent further relative rotation in said one direction, arm means pivoted to said fuselage and to another portion of said door, and means for rotating said rotatable member whereby, upon relative rotation between said rotatable member and said link means, to move at least one portion of said door inwardly to clear the sides of said opening and whereby when said stop prevents said relative rotation, to swing said arm about the pivot of said arm to move said door laterally from said opening.

2. In an airplane or the like fuselage having an opening through the wall thereof and a door normally closing said opening and lying flush with the outer side of the wall of said fuselage, apparatus for supporting said door in the opening and for moving the door clear of the opening, comprising a rotatable member mounted in said fuselage for rotation about a first axis, means for rotating said member, a link member pivotally mounted at one end on said rotatable member for rotation about a second axis spaced from said first axis, the other end of said link member being pivoted to the door, said link member engaging a portion of said rotatable member upon rotation of said rotatable member in such manner as to terminate relative movement of said two members, said movement until said engagement takes place serving to move said door inwardly clear of the sides of the opening, an arm member pivoted to said fuselage and to said door, and means operable only after said inward door movement is completed for moving said door laterally clear of said opening about the pivot of said arm member.

3. In an airplane or the like fuselage having an opening through the wall thereof and a door normally closing said opening and lying flush with the outer side of the wall of said fuselage, apparatus for supporting said door in the opening and for moving the door clear of the opening, comprising a pair of arms pivotally attached each at one end to the door at points spaced apart in the direction in which the door moves in moving clear of the opening, the first arm being pivoted at its other end to the fuselage, a member rotatably mounted in said fuselage, the other end of the second arm being pivotally attached to said member at a point movable about the axis of rotation of said member upon rotation of the member, means for rotating said member first to move said second arm inwardly and thereby to move said door inwardly out of alignment with the fuselage portion surrounding the opening, and a projection on said member and engageable with said second arm for terminating relative pivoting movement of said second arm relative to said member after a predetermined rotation of said member due to said engagement, and for causing said second arm to rotate about the axis of rotation of the member during subsequent rotation of the member due to continuance of said engagement and thereby to cause, through rotation of said second arm, arcuate movement of the door about the point of pivotal attachment of said first arm to the fuselage until said door reaches a position clear of said opening.

4. Apparatus as set forth in claim 3 in which the pivot points of the ends of said arms remote from the door are so positioned relative to each other, and the relative lengths of said arms are so proportioned, that said door partakes of a compound movement during said arcuate movement.

5. Apparatus as set forth in claim 3 in which said second arm is shorter than said first arm, and the pivot axis of said rotatable member is nearer to the door than the pivot axis of the end of the first arm remote from the door, whereby said door partakes of a compound movement after said engagement, said movement involving movement toward the pivot axis of the first arm of the portion of the door to which said second arm is attached, the portion of the door to which said first arm is attached following a circular path about the pivot axis of said first arm.

6. Apparatus as set forth in claim 5, there being two sets of said arms and rotatable members, one set operable on each end of said door.

7. Apparatus for moving a door normally closing an opening in a wall and flush with the wall to a position clear of the opening and overlapping the wall, comprising a pair of arms pivoted each at one end to the door at points spaced in the direction of movement of the door to its wall overlapping position, means pivotally supporting the other ends of said arms, power means for moving the first arm in the direction of its length to move one end of the door out of its flush position and out of alignment with the wall, and means operable after termination of said first movement of the first arm to move the end of said first arm attached to the door through an arc and thereby to cause the portion of the door attached to the second arm to move through an arc about the pivot axis of the other end of said second arm, whereby said door partakes of a compound arcuate movement to a position clear of the opening and overlapping the wall.

FELIX AMIOT.

REFERENCES CITED

The following references are of record in the file of this patent:

UNITED STATES PATENTS

| Number | Name | Date |
|---|---|---|
| 901,531 | Gerdes | Oct. 20, 1908 |
| 1,293,312 | Benson | Feb. 4, 1919 |
| 1,921,415 | Larson | Aug. 8, 1933 |
| 2,031,039 | Haseltine | Feb. 18, 1936 |
| 2,104,144 | Zand | Jan. 4, 1938 |